(12) United States Patent
Plazarte et al.

(10) Patent No.: US 11,484,153 B2
(45) Date of Patent: Nov. 1, 2022

(54) HAND MIXER WITH SOFTENING FUNCTION

(71) Applicant: Sunbeam Products, Inc., Boca Raton, FL (US)

(72) Inventors: Enrique Plazarte, Fort Lauderdale, FL (US); Oliver Anthony Daemi, Stockport (GB); Stephany Karina Lopez Da Silva, Boca Raton, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 140 days.

(21) Appl. No.: 16/771,513

(22) PCT Filed: Mar. 20, 2018

(86) PCT No.: PCT/US2018/023242
§ 371 (c)(1),
(2) Date: Jun. 10, 2020

(87) PCT Pub. No.: WO2018/175369
PCT Pub. Date: Sep. 27, 2021

(65) Prior Publication Data
US 2021/0169275 A1 Jun. 10, 2021

Related U.S. Application Data

(60) Provisional application No. 62/474,332, filed on Mar. 21, 2017.

(51) Int. Cl.
*A47J 43/07* (2006.01)
*A47J 43/044* (2006.01)
(Continued)

(52) U.S. Cl.
CPC ......... *A47J 43/0705* (2013.01); *A47J 43/044* (2013.01); *B01F 33/5011* (2022.01);
(Continued)

(58) Field of Classification Search
CPC . A47J 43/0705; A47J 43/044; B01F 33/5014; B01F 35/95; B01F 2035/99; B02F 2035/99
(Continued)

(56) References Cited

U.S. PATENT DOCUMENTS

2006/0007778 A1 1/2006 Tai
2007/0133347 A1 6/2007 Mok et al.
(Continued)

FOREIGN PATENT DOCUMENTS

JP 2001112648 A 4/2001

*Primary Examiner* — Marc C Howell
(74) *Attorney, Agent, or Firm* — Husch Blackwell LLP

(57) ABSTRACT

The present invention relates to a hand mixer having a heat activation function. The heat activation function preferably allows a user to heat ingredients that are to be mixed by a hand mixer. The hand mixer may include a cavity that has each of a fan, a motor to drive the fan, heated coils, and an output area or mouth. When a user wishes to activate the heating function to soften ingredients in a bowl or other vessel to be mixed, he or she may use a controller to activate the fan and blow air through the heated coils and out from the output area toward the ingredients to be mixed and/or mixing devices used to mix the ingredients, so that the ingredients may be softened.

18 Claims, 9 Drawing Sheets

(51) Int. Cl.
  *B01F 33/501* (2022.01)
  *B01F 35/95* (2022.01)
  *B01F 35/90* (2022.01)
  *B01F 101/00* (2022.01)
(52) U.S. Cl.
  CPC .......... *B01F 33/5014* (2022.01); *B01F 35/95* (2022.01); *A47J 2043/04418* (2013.01); *B01F 2035/99* (2022.01); *B01F 2101/1805* (2022.01)
(58) Field of Classification Search
  USPC .......................................................... 366/129
  See application file for complete search history.

(56) References Cited

U.S. PATENT DOCUMENTS

| | | |
|---|---|---|
| 2015/0351589 A1 | 12/2015 | Boozer |
| 2016/0113445 A1 | 4/2016 | Behar |

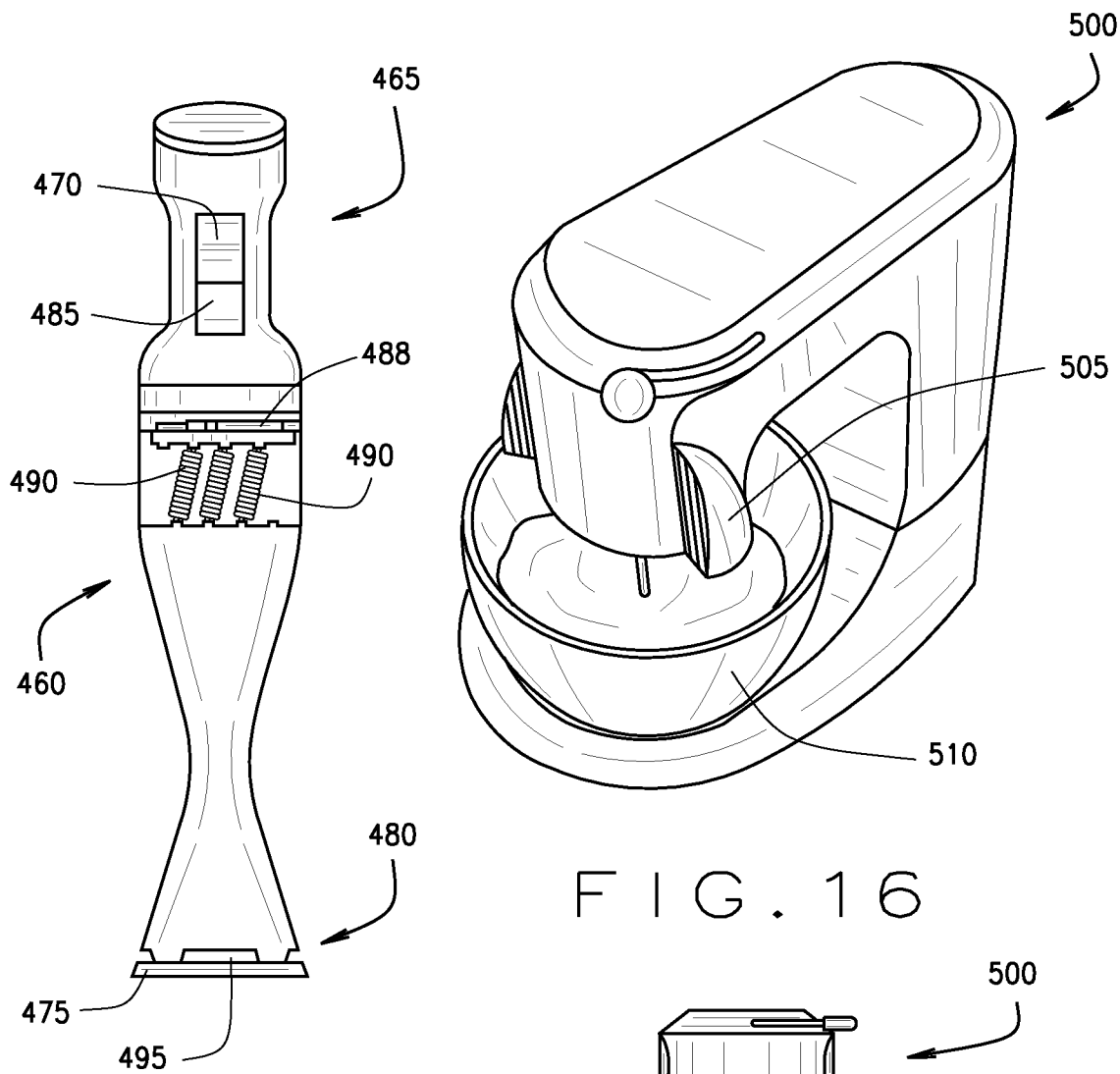
FIG. 15
FIG. 16
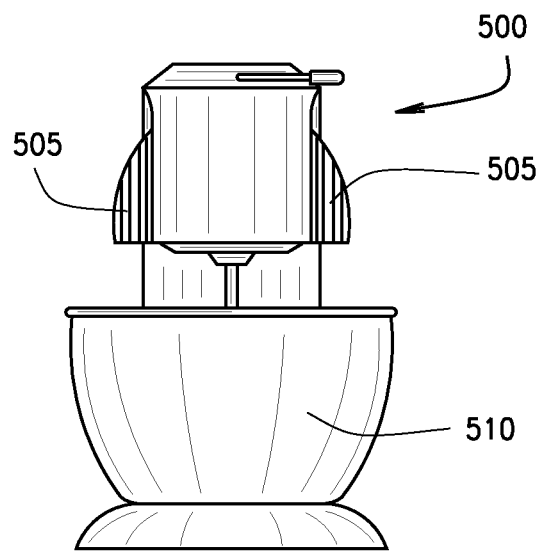
FIG. 17

HAND MIXER WITH SOFTENING FUNCTION

FIELD OF THE INVENTION

This invention relates generally to an electric mixer and more particularly relates to an electric hand mixer that further incorporates a heating apparatus that can be used to soften ingredients to be mixed by the hand mixer.

BACKGROUND OF THE INVENTION

Mixers are kitchen devices that have long been used by amateurs and professionals alike to mix ingredients prior to cooking or baking. Common mixers include hand mixers and stand mixers, both of which make use of a gear-driven mechanism to rotate beaters. The beaters agitate ingredients in a bowl (e.g. solid, semi-solid, or liquid ingredients). Such mixers help to reduce the time and effort required for laborious tasks like stirring, whisking, and beating.

Mixers may be provided as hand-held "hand mixers" having a handle mounted above an enclosure, the enclosure including the motor and gearing used to drive the beaters. Such hand mixers are ordinarily used for smaller mixing jobs, for example those completed by users in their home kitchen. The hand mixers are typically used to mix ingredients in a kitchen container like a bowl that hold the ingredients while mixing.

Stand mixers are alternatives to hand mixers that are larger and have more powerful motors than hand mixers. They are typically used for larger jobs and can reduce preparation time because of their more powerful motors. Stand mixers mount the motor that drives the rotary action in a frame or stand which bears the weight of the device. They generally have a special container that is locked in place while the mixer is operating. A typical home stand mixer includes a wire whisk for whipping creams and egg whites, a flat beater for mixing batters, and a dough hook for kneading.

Hand and stand mixers are often used to mix ingredients that are not naturally soft. For example, when making cookies, bakers often need to mix a cold stick of butter, sugar, vanilla, and eggs. The cold stick of butter, without being melted or softened prior to mixing, can clump and cause the mixer to get stuck or otherwise not smoothly blend. This sort of clumping can make mixing difficult. Moreover, ingredients mixed at lower temperatures are more likely to stick to the beaters used to mix the ingredients than are heated, softened ingredients. This also can add complexity to the mixing process.

Some bakers soften butter or similar ingredients by microwaving or otherwise heating the butter prior to mixing. However, this occupies valuable time and may introduce foul or otherwise unwelcome flavors and odors into the ingredients. For example, if a baker microwaves butter that will be used to bake cookies in a microwave just used to pop popcorn, the popcorn flavor may be introduced to the butter and subsequently the cookies.

It is therefore desirable to provide a softening function for hand mixers and stand mixers alike to heat food so that it is softened prior to or during the mixing process. That way, ingredients to be mixed are softened and the mixing process is made easier.

SUMMARY OF THE INVENTION

An embodiment of the present invention is directed to a hand mixer having a softening function. More particularly, the invention relates to an enhanced hand mixer that includes a heat activation function. The heat activation function may be operated by a user using a control panel located on the hand mixer. The control panel may activate components within the hand mixer to blow heated air toward a bowl containing ingredients to be mixed by the hand mixer.

Various embodiments of hand mixers that are disclosed herein may take on a number of different embodiments. In all of the embodiments, the hand mixer itself performs a mixing function in a manner substantially similar to hand mixers that are known and understood in the art. As such, the hand mixers preferably include a handle that a user may grasp when mixing. Preferably, the hand mixer also includes a control panel that is located near the handle to drive the electrical and mechanical components within a housing of the hand mixer that are used to perform known functions of the hand mixer including mixing, stopping mixing, or adjusting mixing speeds. Many of the electrical and mechanical components that are housed within the hand mixer are known to those skilled in the art, including a motor assembly, pinion gears having spindles, a worm gear, a cooling fan, a speed control switch, an on/off switch, a beater ejector system, and a power source such as a power cord that may be plugged into a wall or a rechargeable battery.

In addition to the aforementioned features, improved hand mixer embodiments disclosed herein also include a controller that may be a part of the control panel that includes a heat button or switch. The heat button or switch may be used to activate the heat activation function used to soften ingredients to be mixed in a bowl and/or beaters used to mix the ingredients. In a preferred embodiment, a first cavity of the hand mixer includes the above described components that have long been used in the art to mix ingredients. A second cavity, separated from the first cavity, for example by a wall member, preferably includes the components necessary to generate the heat activation function described herein. In other embodiments, may be in the same cavity.

More particularly, in various embodiments that are the subject of the present invention, the second cavity may include a fan member which intakes cool air from the environment, a motor used to drive the fan member, and heated coils used to heat the air that is blown by the fan member. In a preferred embodiment, the fan member and motor are located within the second cavity near a back or rear portion of the hand mixer.

An output area is also located on a lower portion of the hand mixer that is in fluid communication with the fan. Thus, airflow generated by the fan and heated by the heating coils is output downwardly through a channel within the second cavity to the output area. The output area may then output the heated air toward a bowl containing ingredients to be mixed and/or beaters used to mix the ingredients. In one embodiment, the output area from which warmed air is blown is substantially in line with beaters of the hand mixer. In an alternative embodiment, the channel may be repositioned such that the output area is more distal. Such a more distal location may be closer to the rear portion of the hand mixer than in the above described embodiment. In this embodiment, that air may be directed more precisely to the bowl containing the ingredients to be mixed without missing the bowl.

In at least one embodiment, an output attachment member having a baffled surface may be attachable to the lower portion of the hand mixer at the output area. The output attachment member may include a patterned, for example baffled, surface used to direct the air generated by the fan member smoothly and directly at the ingredients to be mixed and/or the beaters (or alternative mixing devices like a dough hook). At a back portion of the hand mixer, substantially adjacent to where the fan member is located in one embodiment, a meshed surface may be provided that is used to filter in flow air and help prevent the fan from taking in lint, dust, dirt, and other debris. On the meshed surface, a removable lint cover may be provided that may be cleaned from time to time to prevent clogging of the mesh surface.

In another embodiment, the fan member may be placed on a front portion of the hand mixer to draw in cool ambient air from the environment. Airflow is then generated by the fan member rearwardly through heated coils and output adjacent to the beaters so that air is directed downwardly and rearwardly into the bowl or other vessel in which ingredients may be mixed. That embodiment, like the embodiments described above, may also include each of the output attachment member and the meshed cover to prevent lint from entering the second cavity.

In a similar but modified embodiment, the fan member is located on a front portion of the hand mixer, and a funnel member is provided that extends downwardly from the hand mixer and at least partially surrounds the beaters. In that embodiment, air that is generated by the fan member travels through the second cavity of the hand mixer and into the funnel member, which includes heated coils. As the air generated by the fan passes through the heated coils and in the funnel member, the air is warmed before exiting the funnel member. In a preferred embodiment, both of the beaters are attached to the hand mixer in a manner that allows them to pass through the funnel member in order to be secured within the hand mixer. Thus, when the funnel member outputs air to heat ingredients to be mixed within the bowl member, the beaters or other mixing device may also be heated.

In another embodiment, a fan is preferably coupled to a shaft to which the beaters are attached within the hand mixer, and two funnel members are provided, one for each beater member. Each beater is therefore provided with a funnel member and a fan. The funnel members include coils so that when air is generated by the fan, each beater, and the ingredients to be mixed below each beater or other mixing device are warmed when the fan associated with each beater is activated. In that embodiment, the coils, like in the previously described funnel member embodiment, are retained and secured within each funnel member.

In yet another alternative embodiment, the fan member, heated coils, and motor may be housed within the second cavity of the hand mixer toward the rear portion of the hand mixer relative to the beaters. In that embodiment, the output area includes a nozzle member that is attached to the lower portion of the hand mixer that receives air heated by the coils and directs the heated air forwardly and downwardly into the bowl containing the ingredients to be mixed.

In a similar but modified version of the hand mixer having a softening function including the nozzle member, each beater shaft is provided with a funnel member that is internal to the cavity, along with a fan, motor, and heated coils. In this embodiment, air that is generated by the fan and heated by the coils is funneled within the cavity to each of the beaters so that the beaters are heated internally, and there is not an output area external to the hand mixer. In that embodiment, the focus is on heating the beaters themselves directly rather than directing heated air directly to the ingredients to be mixed.

In yet another alternative embodiment, the heating element is preferably provided externally to the output area. Not only is air generated by a fan from within the hand mixer, heated as it is blown downwardly toward the beaters, but radiant heat is also generated by the heating element that may heat and soften ingredients to be mixed.

In any of the above described embodiments, a temperature sensor such as an infrared sensor may be provided on a bottom portion of the hand mixer. The temperature sensor may use known technology to measure the temperature of the ingredients to be mixed, and if necessary, instruct one of the heat activating functions described above to initiate so that ingredients contained within the bowl member may be heated up and softened.

In addition to hand mixers, the above-described heat activation functions may be used with hand blenders or stand mixers that perform mixing functions and are known and understood in the art. In those embodiments, a motor, fan, and heated coils may be used to blow air out from either the hand blender or the stand mixer toward ingredients to be mixed in a bowl associated with the hand blender or stand mixer.

These and other aspects and advantages of the present hand mixer having a heat activation function for softening ingredients will become apparent to those skilled in the art after considering the following detailed description in connection with the accompanying drawings.

BRIEF DESCRIPTION OF THE DRAWINGS

For a better understanding of the present invention, reference may be made to the following accompanying drawings.

FIG. 15 is cross-sectional view of a stick blender with a softening function constructed according to the teachings of the present invention.

FIG. 16 is a perspective view of a stand blender with a softening function constructed according to the teachings of the present invention.

FIG. 17 is a front elevation view of the stand blender of FIG. 16.

DETAILED DESCRIPTION OF THE INVENTION

Figure 1:
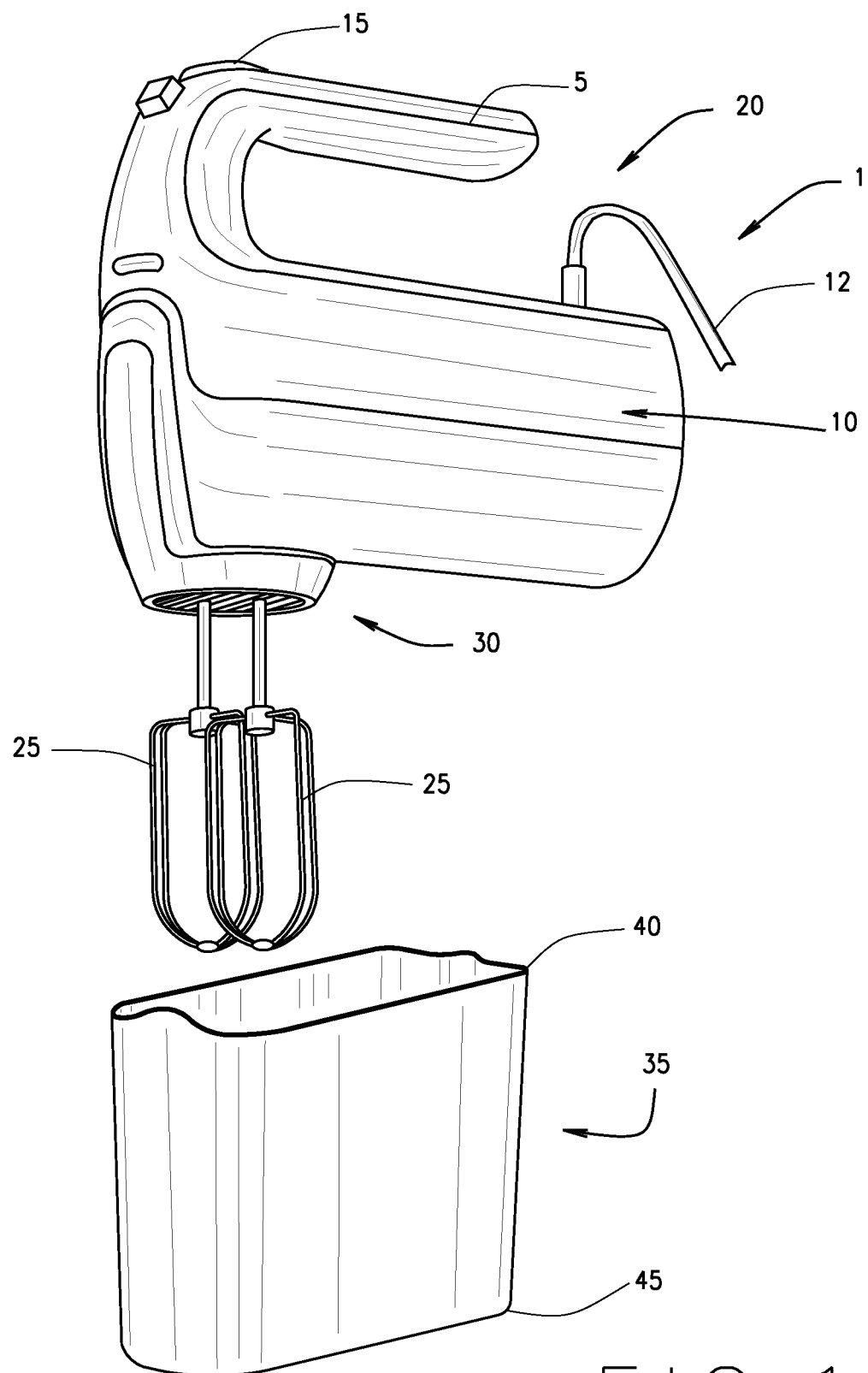
FIG. 1 is a perspective view of one embodiment of a hand mixer with a softening function and a container for receiving the same constructed according to the teachings of the present invention.

Turning first to FIG. 1, a first embodiment of a hand mixer 1 is provided. The hand mixer 1, like the various other embodiments of hand mixers, hand blenders, and stand mixers described below, includes a softening function that uses heat to soften ingredients to be mixed by the hand mixer 1 prior to those ingredients being mixed.

The hand mixer 1, like other hand mixers known in the prior art, includes a handle 5 for a user to grasp when operating the hand mixer 1. The handle 5 preferably extends upwardly from a main housing 10 of the hand mixer 1 that includes various electrical and mechanical components used to operate the hand mixer 1.

Many of the various electrical and mechanical components housed within the hand mixer 1 are of the type long used in the art to control various aspects of the hand mixer 1. Those electrical and mechanical components may include, but are not limited to, a motor assembly, pinion gears (preferably, two) with spindles, a worm gear, a cooling fan, a speed control switch, an on/off switch, a beater ejector system, and either a power cord or rechargeable battery. In the embodiment illustrated in FIG. 1, a power cord 12 that may be plugged into a wall outlet is used to power the hand mixer 1. In other embodiments, a rechargeable battery may be used to power the hand mixer 1. Other foreseeable electrical and mechanical components may be present in various alternative embodiments of the hand mixers disclosed herein, so long as the hand mixer can carry out its intended function of mixing ingredients.

The hand mixer 1 also preferably includes a control panel 15 located near the handle 5 at an upper portion 20 of the hand mixer 1. The control panel 15 may be used to drive electrical and mechanical components in the housing 10 to carry out various known functions of the hand mixer 1, including initiating mixing, stopping mixing, or adjusting mixing speeds. In a preferred embodiment, the control panel 15 is embodied as several buttons: a heat button for introducing the heat activation function described below, a boost button to increase power supplied to the mixer's motor, a sliding speed control button to adjust the speed of beaters such as beaters 25 from the mixer 1, and a button for releasing beaters 25. In alternative embodiments, various other buttons may be included on the control panel 15. Similarly, the beaters 25 may be replaced with other mixing devices like flat beaters or dough hooks.

The beaters 25 of the hand mixer 1 are located at a lower portion 30 of the mixer 1. The beaters 25 illustrated in FIG. 1 may be substantially similar to beaters long used in the art that are releasably attachable to a lower portion 30 of the mixer 1. The beaters 25 may be controlled by the control panel 15 such that when they are activated, they may be used to mix ingredients within a bowl member or other cavity for containing ingredients to be mixed. The control panel 15 may also be used, in some embodiments, to eject the beaters 25 from the lower portion 30 of the mixer 1 for cleaning.

In at least one embodiment, an open-topped and closed-bottom container 35 may be used to secure the mixer 1 and its beaters 25 when not in use. In that embodiment, the lower portion 30 of the mixer 1 may be releasably secured within an upper portion 40 of the container 35, for example by way of a friction or snap fit. Meanwhile, the beaters 25 may rest in a lower portion 45 of the container 35 having a closed bottom. The container 35 may help a user to store the mixer 1 and its beaters 25 securely and conveniently when not in use.

As described above, the hand mixer 1 preferably includes a heat activation function that may be controlled by a button of the control panel 15. In alternative embodiments, the heat activation function may be controlled by a switch, slider or other controller. When activated, the heat function may be used to: blow heated air toward ingredients to be mixed; blow air toward the beaters; and/or radiate heat toward the ingredients to be mixed, all in an effort to soften the ingredients and reduce the likelihood of the ingredients sticking to the beaters. The heat activation function, and the variety of embodiments it may take on and components it may include, are described in detail herein below in association with the various drawings.

Figure 2:
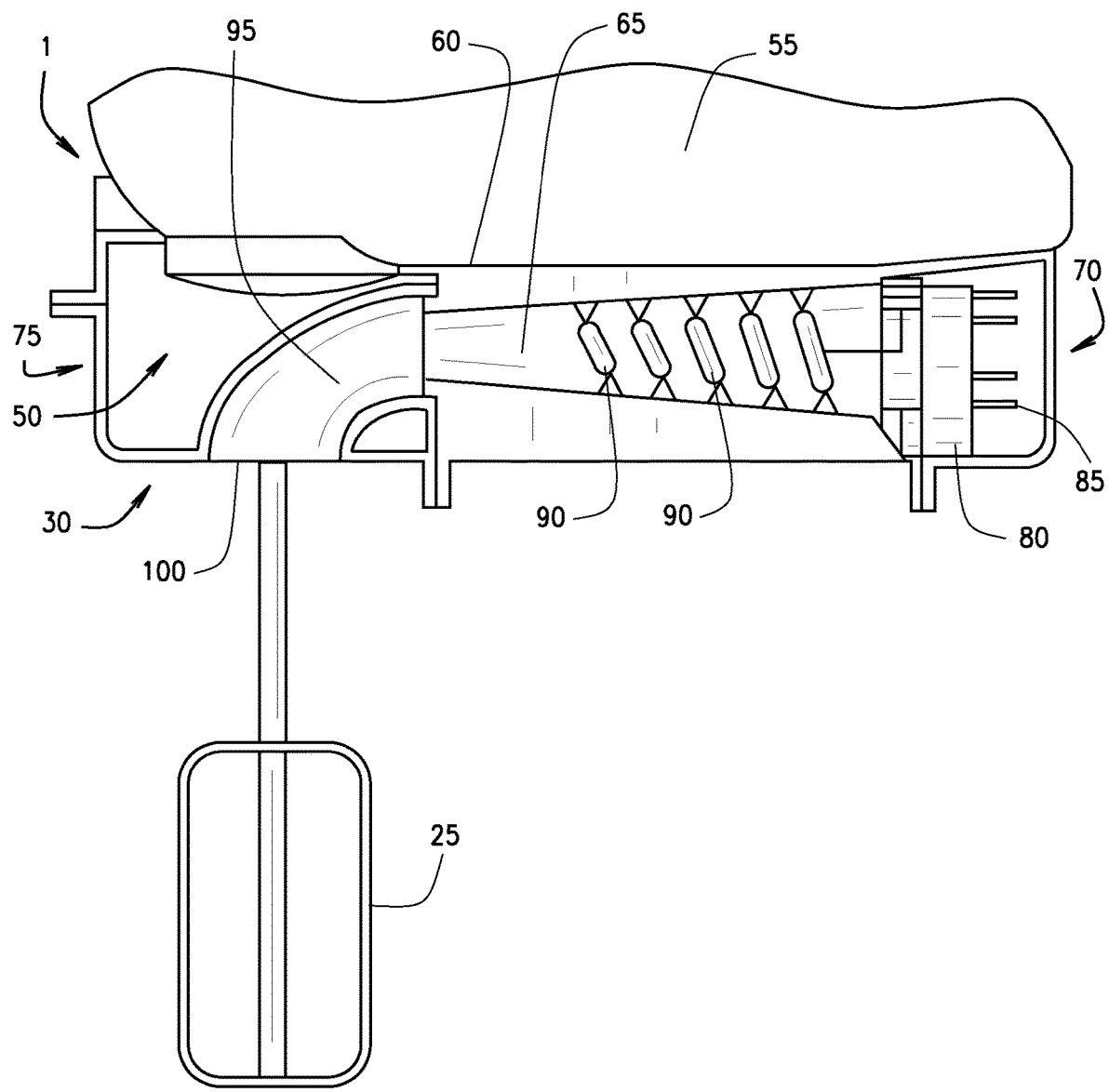
FIG. 2 is a partial cross-sectional view of the hand mixer of FIG. 1.

A first embodiment of a mixer 1 including a heat activation function that may be used to soften ingredients to be mixed in a bowl or other vessel is illustrated in FIG. 2. Near the lower portion 30 of the mixer 1, a cavity 50 is provided that houses the components that generate the heat activation function. The cavity 50 is preferably separate from a second cavity 55 that together make up the housing 10 of the mixer 1, although in some embodiments, a single cavity may be used. In the embodiment illustrated in FIG. 2, the cavity 50 is separated from the cavity 55 by a wall member 60. In some embodiments, the cavity 50 may be formed as a separate housing that is releasably attachable to a hand mixer without a heat activation function. In that embodiment, the heat activation function may be thought of as an "add-on" device that does not come enabled on a standard hand mixer, but a user may purchase if he or she wishes to have a heat activation function. In that embodiment, the "add-on" device including the heat activation function may be snap-fit, screwed, or otherwise temporarily attached to the hand mixer 1 including the components needed to perform the mixing function.

The heat activation function and its mechanical and electrical components used to carry out its operation are preferably contained within the cavity 50. The cavity 50 preferably includes an airflow conduit or channel 65 that runs from a rear portion 70 of the hand mixer 1 towards a front portion 75 of the hand mixer 1. Near the rear portion 70, a fan 80 driven by a motor 85 is preferably located within the cavity 50 in communication with the channel 65. The fan 80 may be located near the rear portion 70 of the mixer 1 so that it is located sufficiently near (and in communication with) the ambient environment. Thus, when activated, the fan 80 is able to draw in air from the environment to be subsequently heated by the process and components described below. The fan 80 may be operated by the motor 85 or another motor within the hand mixer 1, and may be controlled by electronic components that are housed within the cavity 55, or in alternative embodiments, within the cavity 50.

When a user wishes to activate the heating function of the mixer 1 in order to soften ingredients to be mixed by the mixer 1, he or she may use the control panel 15 to activate the motor 85 and thus the fan 80. To heat up air generated by the fan 80, heated coils 90 are preferably provided within the channel 65. The heated coils 90 may be of the type known or foreseeable in the art. As a non-limiting example, a bare, coiled nichrome wire that's wrapped around insulating mica boards. The heated coils 90 may be controlled by electronics also housed within the cavity 55. When the motor 85 is activated, the coils 90 are also preferably activated so that when the motor 85 drives the fan 80, air produced by the fan 80 is passed through the coils 90 and thus heated.

In the embodiment illustrated in FIG. 2, the channel 65 tapers inwardly from the rear portion 70 of the mixer 1 to the front portion 75 of the mixer 1. Before exiting the mixer 1, air generated by the fan 80 and heated by the coils 90 may be delivered to an output channel 95. The output channel 95 directs air from within the channel 65 forward toward the front portion 75 of the mixer 1 but also downwardly toward its lower portion 30. An output area, or mouth 100 is preferably provided substantially in line with where the beaters 25 are located when the beaters 25 are releasably secured within the mixer 1. That way, when the heat function is activated, the heated air is directed downwardly into a mixing bowl or other vessel in which the ingredients to be softened are located. As the heated air exits the mouth 100, it also preferably blows past the beaters 25, thus heating the beaters 25 as well in the process of heating the ingredients to be mixed.

Figure 3:
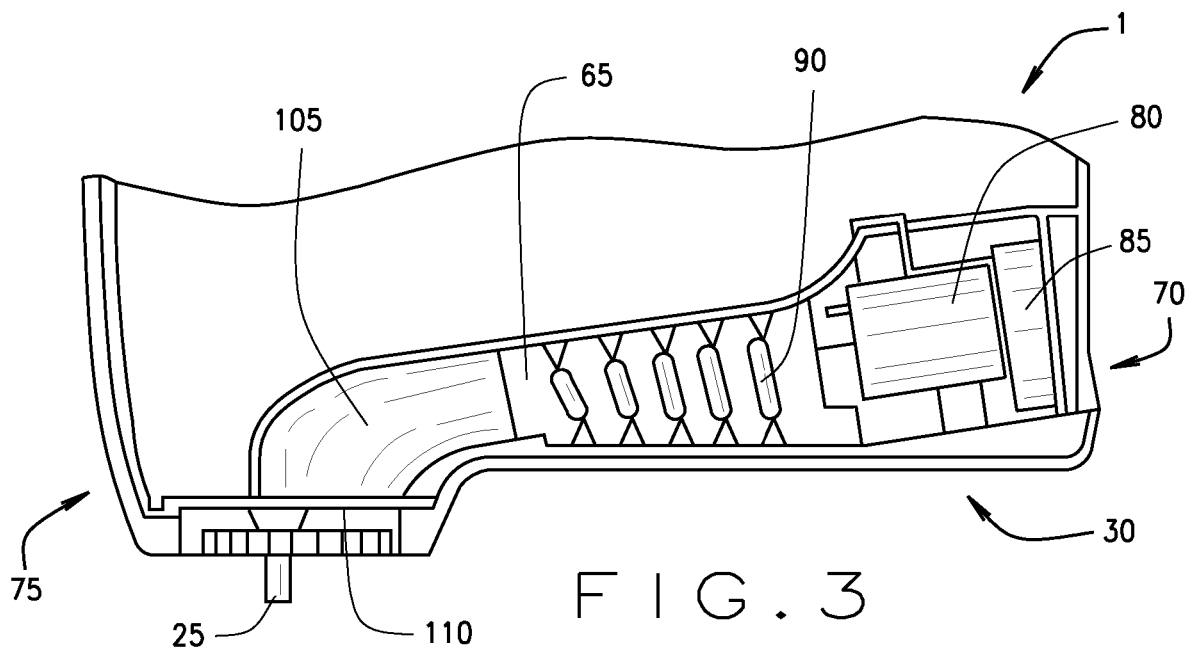
FIG. 3 is a partial cross-sectional view of an alternative embodiment of the hand mixer of FIG. 1.

In the embodiment illustrated in FIG. 2, the output area or mouth 100 of the exit channel 95 is located in substantial alignment with the beaters 25. However, in an alternative embodiment, the output channel 95 may not be centered on the beaters 25, and may be located closer to the rear portion 70 of the hand mixer 1. In such an embodiment, an example of which is provided in FIG. 3, an output channel 105 and corresponding mouth 110 are preferably located nearer to the rear portion 70 of the hand mixer 1 than in FIG. 2. In this alternative embodiment, air generated by the fan 80 through heated coils 90 may exit the mouth 110 and project forward due to momentum towards a vessel associated with the mixer 1. Air that is passed through the channel 105 and the mouth 110 may have a particular forward momentum and velocity that may cause the air to continue toward the front portion 75, even after the downturn of the output channel 105. In alternative embodiments, a mouth such as the mouth 100 or 110 may be located elsewhere on the lower portion 30 of the hand mixer 1 so that airflow is blown from the channel 95 or 105 at an appropriate location. The heated air may then be blown into the vessel so that the ingredients to be mixed are properly heated and the beaters 25 are also heated.

Figure 4:
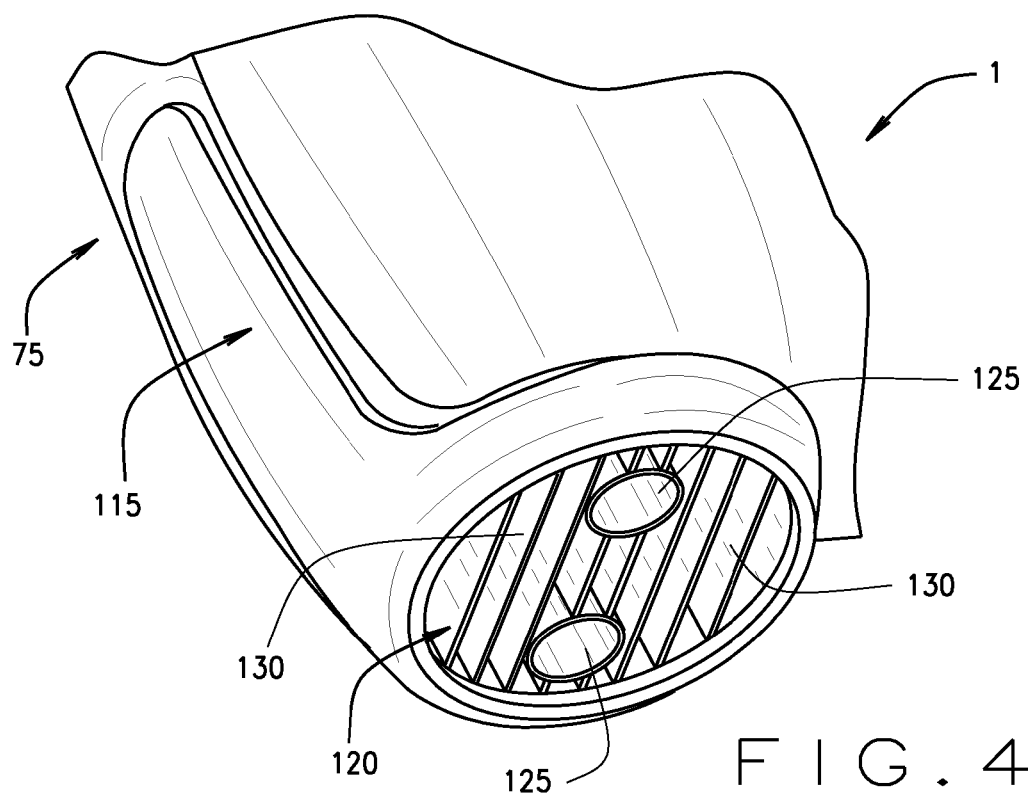
FIG. 4 is a partial perspective view of an attachment blower member associated with the hand mixer of FIG. 1.

Turning now to FIG. 4, a blower attachment member 115 is shown and illustrated that may be releasably attachable to the front portion 75 of the hand mixer 1. The attachment member 115 may serve to direct heated air that is blown through the mouth 100, 110 toward ingredients to be mixed and/or the beaters 25. The attachment member 115 is preferably detachable from the hand mixer 1 so that it may be easily cleaned. In the embodiment illustrated in FIG. 4, the attachment member 115 may be attached to the hand mixer 1 using a friction or snap fit such as those that are long known and understood in the art. In alternative embodiments, other fastening mechanisms may be utilized.

The attachment member 115 preferably includes a substantially planar output portion 120 that is designed to mate with the mouth 100, 110, or similar output area from which heated air is output. While the output portion 120 may take on a number of configurations, in a preferred embodiment, the output portion 120 includes two apertures 125 through which beaters 25 may be inserted so that the beaters 25 may be secured within the hand mixer 1 in a known and understood manner. The output portion 120 is also preferably baffled such that it includes a plurality of equally spaced and parallel baffle members 130. By including the baffle members 130, the output portion 120 may help to direct heated air downwardly into a mixing bowl or other vessel. Thus, air that is heated may not be wasted by flowing outwardly from the output portion 120 outside of the mixing bowl where no ingredients are located. The baffle members 130, in alternative embodiments, may be angled relative to the front portion 75 of the mixer 1, either rearwardly or forwardly. In yet other embodiments, they may not cover the entirety of the output portion 120, and instead a majority of the output portion 120 may be solid such that a narrower but stronger air flow passes through the output portion 120. Alternatively, different patterns, holes, slots, or other shapes may be present on the output portion 120 to allow for air flow that is smooth, unrestricted and short.

The air flow is preferably centered on the beaters 25 such that ingredients to be mixed are effectively softened. Placing a baffle or mesh on the output portion 120 or otherwise redirecting the flow preferably does not create hot spots within the attachment member 115 or the channels 95 or 105. Hot spots would lower the airflow temperature as it is passed on to the ingredients to be mixed and/or beaters 25.

Figure 5:
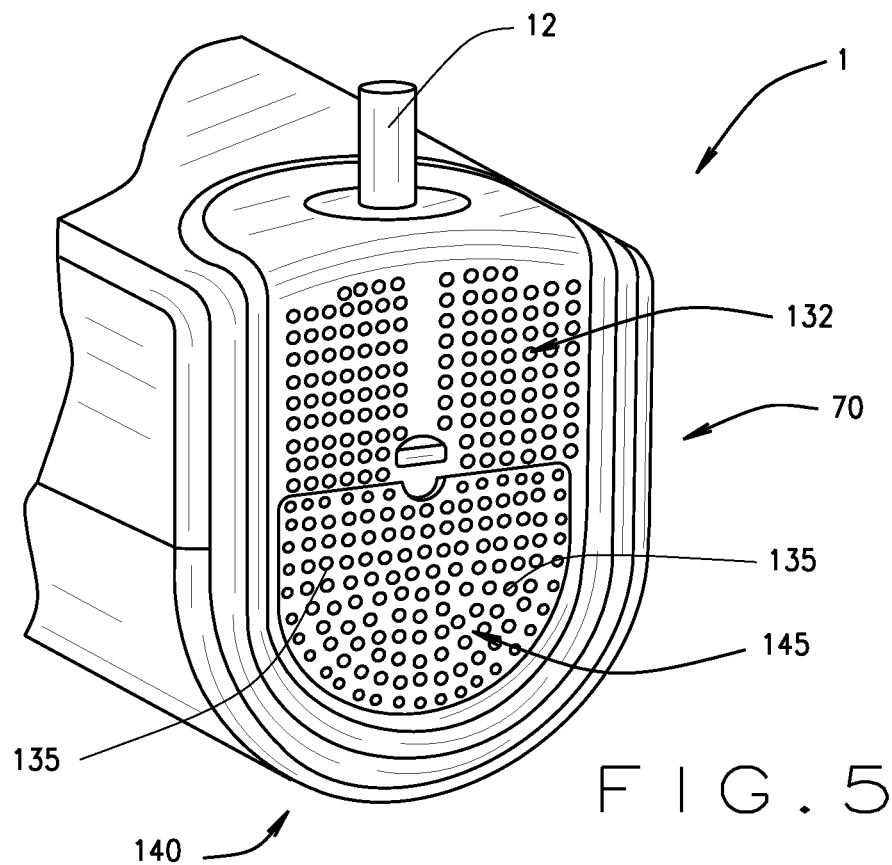
FIG. 5 is a partial perspective view of a rear portion of the hand mixer of FIG. 1.

Turning now to FIG. 5, a rear portion 70 of the hand mixer 1 is illustrated in greater detail. In an example embodiment, the rear portion 70 of the hand mixer 1 includes a substantially flat surface 132 including a plurality of hole members 135 extending there through. The hole members 135 make the flat surface 132 at the rear portion 70 of the hand mixer 1 substantially meshed. When the motor 85 is activated and the fan 80 begins to operate, air that is drawn in by the fan 80 is filtered prior to entering the cavity 10, and more particularly, the cavity 50. Lint, dust and other debris is prevented from entering the cavity 55 by meshed hole members 135 so that cleaner air is passed through the holes 135 that make the surface meshed. If dust, lint and other debris were able to penetrate the surface at the rear portion 70 of the hand mixer 1, that same lint, dust and other debris may be blown into the ingredients being mixed, thus tainting the ingredients. Near a bottom portion 140 of the rear surface 132, a releasable and removable lint cover 145 is provided that also includes the plurality of holes 135.

Figure 6:
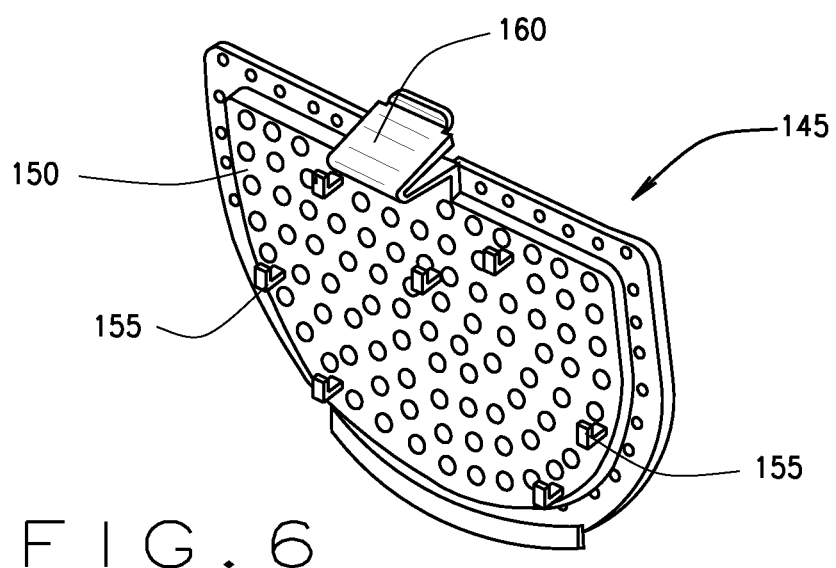
FIG. 6 is a perspective view of a lint trap associated with the hand mixer of FIG. 1.

The lint cover 145, an interior portion 150 of which is illustrated in greater detail in FIG. 6, may be removed from the surface 132 for easy cleaning. Lint or other debris trapped within the lint cover 145 may thus easily be removed and cleaned to preserve the integrity of the filtering qualities of the lint cover 145. In the embodiment illustrated in FIGS. 5 and 6, the lint cover 145 is removable using a plurality of extension members 155 that may be received by a plurality of cavities located on the unillustrated surface. The manner in which those extension members 155 and cavities engage and mate with one another is well known and understood in the art.

The interior portion 150 of the lint cover 145 is also preferably provided with a flexible tab member 160 that may be used to remove the lint cover 145 from the rear portion 70 of the mixer 1. To do so, a user would act in a known manner to push downwardly on the tab member 160 and pull the lint cover 145 rearwardly from the hand mixer 1. When the user wishes to return the lint cover 145 to the hand mixer 1 after cleaning, the tab member 160 may flex downwardly and self-guide into a cavity with which it is associated until it snaps back to its original position, the extensions 155 are retained within apertures at the rear portion 70 of the hand mixer 1, and the lint cover 145 is secured to the hand mixer 1.

While not illustrated, a further surface may be provided that is interior to the lint cover 145. That surface is preferably not removable to prevent a user from touching the fan blades which may be located adjacent to the illustrated surface.

Figure 7:
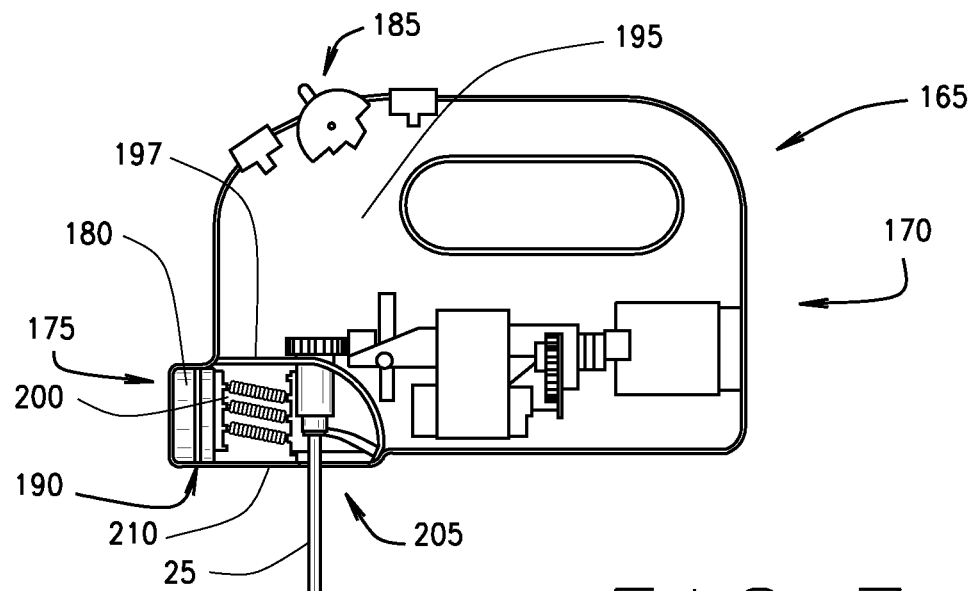
FIG. 7 is a cross-sectional view of a second embodiment of a hand mixer with a softening function.

An alternative hand mixer 165 is shown and illustrated in FIG. 7. The hand mixer 165 operates substantially similarly to the hand mixer 1 disclosed hereinabove. However, the heat activation function is different for the hand mixer 165. Rather than being disposed at a rear portion 170 of the hand mixer 165 (like the hand mixer 1), the heat activation function, and the components that perform the same, are principally disposed at a front portion 175 for the hand mixer 165. A fan member 180 substantially similar to the fan member 80 is preferably provided at the front portion 175 of the hand mixer 165. The fan 180 is preferably controlled by a control panel 185 that may be embodied in FIG. 7 as a button, but like the control panel 15 could take on a number of embodiments. When the control panel 185 is activated, a motor (not illustrated) associated with the fan 180 activates the fan 180 to pull air from the environment near the front portion 175 of the hand mixer 165 and blow it into a compartment 190 separate from a second compartment 195. The second compartment 195 preferably includes and secures many of the known electrical and mechanical components of the hand mixer 165. In an example embodiment, the first and second compartments 190, 195 are preferably separated from one another by a wall member 197 that preferably prevents air generated within the cavity 190 from entering the compartment 195. In other embodiments, a single cavity may be used.

Once air is drawn into the cavity 190, heating coils 200 (substantially similar to the heating coils 90) within the cavity 190 preferably heat the air that has been blown into the cavity 190 by the fan 180. At a bottom portion 205 of the hand mixer 165 near the front portion 175 of the hand mixer 165, an output area or mouth 210 is provided from which heated air may be blown downwardly into a bowl or other vessel in which ingredients are to be mixed. That same heated air may pass the beaters 25 on its way to the ingredients. Thus, the heated air may be used to soften ingredients contained within the bowl or other vessel and also heat up the beaters 25.

In some embodiments, the output area or mouth 210 may be a single aperture located on the bottom portion 205 of the hand mixer 165, and in alternative embodiments, it may be two different mouths that are located adjacent to one another and the beaters 25. In any event, the mouth 210 may be provided such that heated air flow from the mouth 210 is smooth, unrestricted, and short. Output attachment members substantially similar to the output attachment members 115 described above (potentially including baffle members 130) may be associated with the mouth or mouths 210 to help smoothly direct air toward the ingredients and/or beaters 25.

Figure 8:
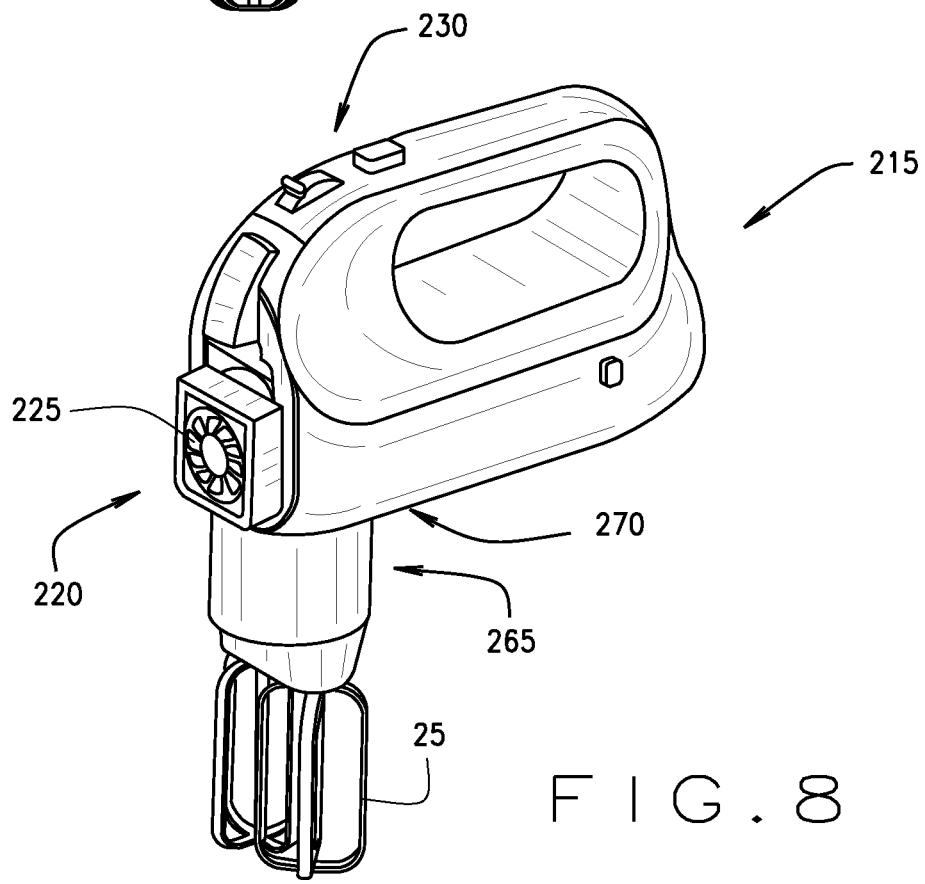
FIG. 8 is a perspective view of a second embodiment of a hand mixer with a softening function.
Figure 9:
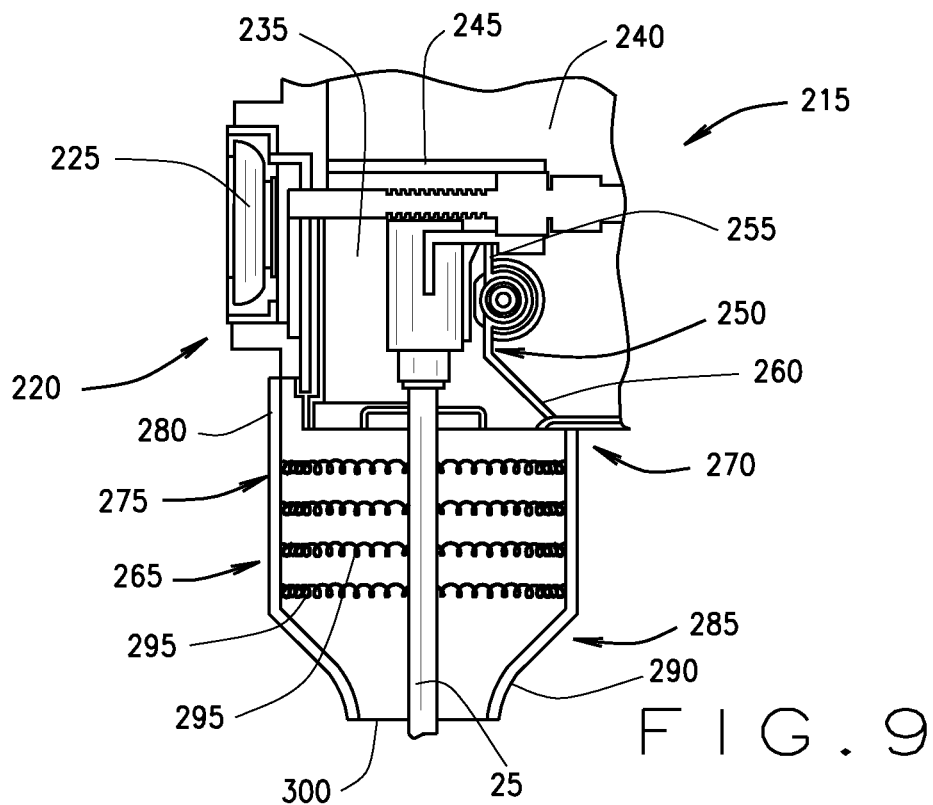
FIG. 9 is a partial cross-sectional view of the second embodiment of the hand mixer of FIG. 8.

Turning now to FIGS. 8 and 9, a hand mixer 215 having an alternative heat activation function is provided. As was the case for the hand mixer 165, the heat activation function for the hand mixer 215 is located at a front portion 220 of the hand mixer 215. More particularly, a fan 225 located at the front portion 220 of the hand mixer 215 may be able to draw in ambient air, for example, when activated by a control 230 substantially similar to the other control panels and/or buttons described herein. It should be noted that the fan 225, while not shown in FIGS. 8 and 9, may be protected by a surface like the surface 132 and may include a lint cover like the lint cover 145 to keep the fan 225 from blowing lint, dust, and other debris into ingredients to be mixed.

When the control 230 activates the fan 225, air is drawn into a cavity member 235 (shown in FIG. 9) that is separated from a second cavity 240 in which many of the electrical and mechanical components that are typically used to operate a hand mixer, such as the hand mixer 215 are located. The cavity 235 and the cavity 240 are preferably separated from one another by a top diverter 245 and a bottom diverter 250. The top diverter 245 and bottom diverter 250 are preferably provided as wall members that serve to prevent air blown into the cavity 235 from entering the cavity 240. As noted above, a single cavity may be employed.

The top diverter 245 may be substantially flat and perpendicular to the fan 225 such that it extends from the front portion 220 of the mixer 215 toward its rear portion. The bottom diverter 250 may include a first portion 255 that is substantially parallel and lies in the same plane as the fan 225, as well as a second portion 260 that tapers outwardly away from the first portion 255, and away from the front portion 220 of the hand mixer 215. The second outwardly tapered, flared portion 260 of the bottom diverter 250 may help to increase the volume of the cavity 235 so that a wider air flow is provided to a funnel member 265 (which is described below) to which air is diverted and subsequently heated.

The funnel member 265 through which air drawn in by the fan 225 may be directed by the top and bottom diverters 245, 250, may be releasably attached to a bottom portion 270 of the hand mixer 215. In a preferred embodiment, the funnel member 265 is releasably attachable to a bottom portion 270 of the hand mixer 215 by a friction fit or other snap engagement. In yet alternative embodiments, the funnel member 265 may be integrally formed with the bottom portion 270 of the hand mixer 215.

The funnel member 265 preferably includes a first upper portion 275 having a substantially cylindrical wall member 280 that circumscribes the funnel member 265. A second portion 285 below the first portion 275 includes a wall member 290 that tapers inwardly near a bottom portion 295 of the funnel member 265. Within the first portion 275, a plurality of heated coils 295 are preferably provided.

When air is blown into the cavity 235 by the fan 225 and subsequently into the first portion 275 of the funnel member 265, the heated coils 295 preferably heat the air before the air enters the second portion 285 of the funnel member 265. At the bottom portion 290 of the funnel member 265, an output area or mouth 300 is preferably provided from which the air, which has been heated by the heated coils 295, may be output. It should be noted that the beaters 25 associated with the hand mixer 215 are preferably positioned and located such that they extend downwardly and through the funnel member 265. Thus, when heated air is passed through the funnel member 265, the beaters 25 that are contained therein are heated, in addition to the ingredients to be mixed that are positioned and located below the mouth 300 of the funnel member 265 and heated thereby. It should be noted that an output attachment such as the output attachment 115, or a similar output attachment, may be present at the mouth 300 of the funnel member 265 in some embodiments.

Figure 10:
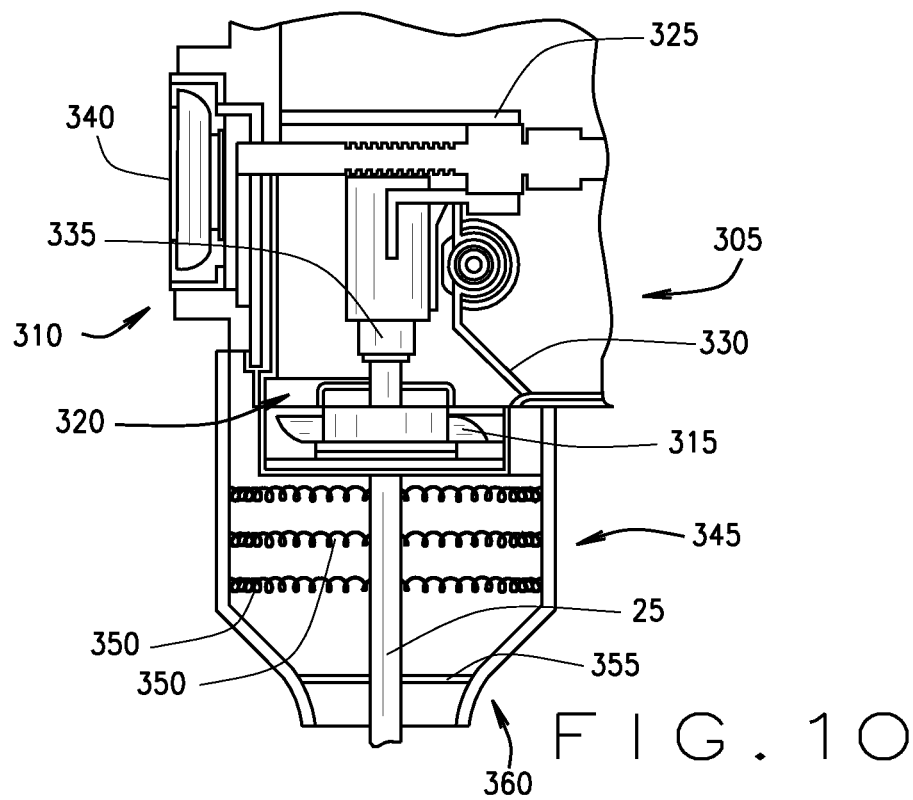
FIG. 10 is a partial cross-sectional view of a third embodiment of a hand mixer with a softening function.

A portion of an additional alternative hand mixer 305 is shown and illustrated in FIG. 10. The hand mixer 305, like the hand mixer 215, preferably includes a heat activation function that is located primarily at a front portion 310 of the hand mixer 305. However, unlike the hand mixer 215, a fan 315 of the the hand mixer 305 is contained entirely within a cavity 320 of the hand mixer 305. The cavity 320 may be but need not be separated from the remainder of the hand mixer 305 (including the various electrical and mechanical components that operate the hand mixer 305) by a top diverter 325 and a bottom diverter 330, which are substantially similar to the top and bottom diverters 245, 250. The fan 315 in the hand mixer 305 is preferably coupled to a shaft 335 extending vertically through the cavity 320, to which a beater such as the beater 25 may be attached. In a standard mixer 305, there may be two beater shafts 335 and beaters 25 provided. In the embodiment illustrated in FIG. 10, only one shaft 335 and beater 25 is shown and illustrated because the other shaft 335 and beater 25 is behind and covered by those which are illustrated.

While not illustrated, the fan 315 that is coupled to the shaft 335 is preferably powered by a motor. As has been described above, when a user wishes to activate the heat function, he or she may use a control panel having a controller, such as a button, to activate the motor (and thus the fan 315) to draw air in via an opening 340 located at the front portion 310 of the hand mixer 305. Air is then downwardly pulled through the cavity 325 and blown by the fan 315 to a funnel member 345 substantially similar to the funnel member 265. Like the funnel member 265, the funnel member 345 preferably includes a plurality of heated coils 350 that circumscribe an interior of the funnel member 345. Thus, when air is blown downwardly by the fan 315, the air may be heated by the heated coil 350. It should be noted that the coils may be activated at substantially the same time as when the fan 315 is activated by a controller.

An additional feature, an ingredient screen 355, is shown and illustrated in FIG. 10. The ingredient screen may be a mesh screen that is placed toward a lower portion 360 on the funnel member 345 so that air traveling through the funnel member 345 must pass through the screen 355 prior to being blown out of the funnel member 345. The ingredient screen 360 is preferably made of a mesh material and may help to prevent ingredients such as flour, or even debris like dust or dirt, from being drawn into the hand mixer 305 when the fan 315 is not in use or when the fan is blowing air into the bowl containing ingredients to be mixed. The ingredient screen 355, or a screen substantially similar thereto, may be present in any of the embodiments of hand mixers described herein.

Figure 11:
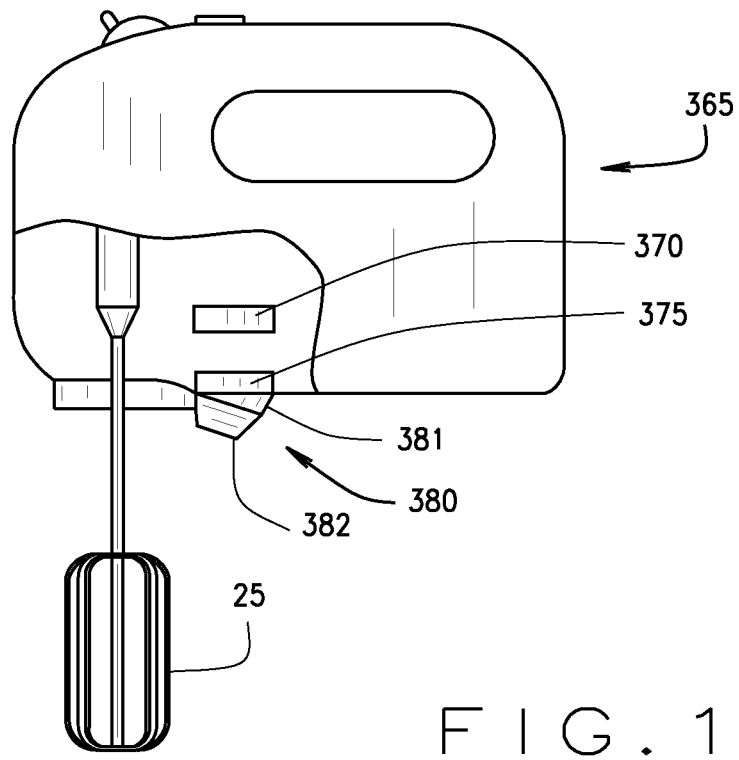
FIG. 11 is a cross-sectional view of a fourth embodiment of a hand mixer with a softening function.

Turning now to FIG. 11, yet another alternative hand mixer 365 is provided. The hand mixer 365 preferably operates in a manner that is substantially similar to the previous embodiments of hand mixers that are described above. Like the above described hand mixers, the hand mixer 365 includes a fan 370 (preferably driven by a motor, not illustrated) and heat coils 375 within a cavity. However, unlike other hand mixers described above, air generated by the fan 370 using one of the aforementioned control mechanisms that is heated by the coils 375 is passed through a nozzle member 380. The nozzle member 380 preferably has a cross-sectional area that tapers inwardly from a rear portion 381 to a front portion 382 so that an increased air flow may be created at the front portion 382 of the nozzle member 380. The nozzle member 380 is preferably pointed toward a front portion 385 of the mixer 365 and downwardly such that when the fan 370 and the heated coils 375 are activated, the heated air may be directed toward the beaters 25, as well as the bowl or other vessel containing ingredients to be mixed so that those ingredients may be softened. In the illustrated embodiment, one nozzle member 380 is shown, but in some embodiments, two or more nozzle members like the nozzle member 380 may be associated with the hand mixer 365.

Figure 12:
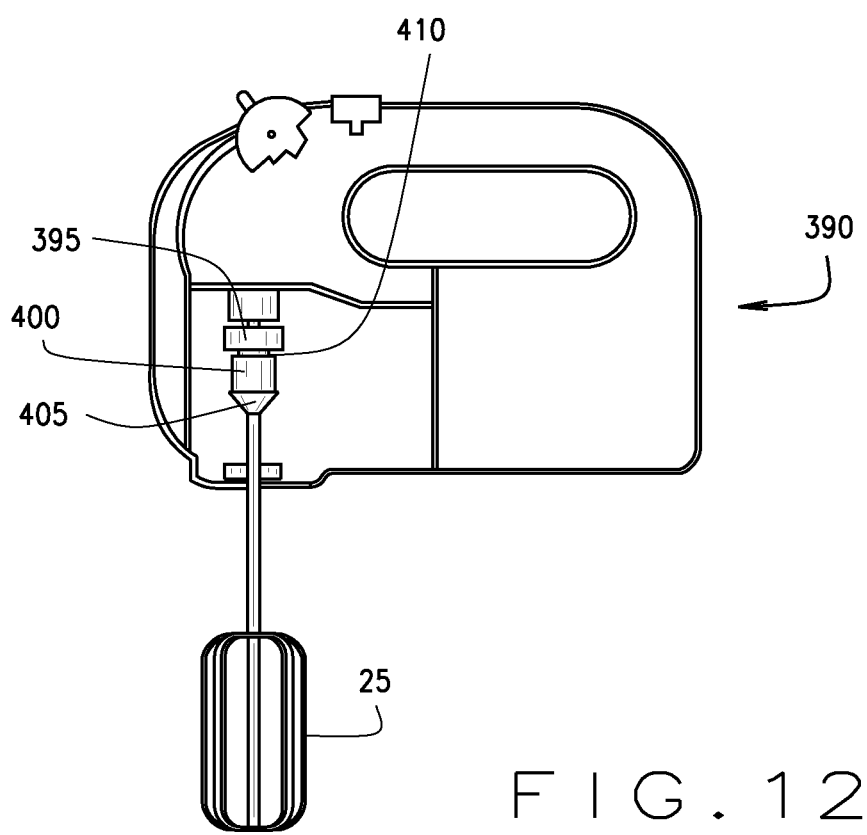
FIG. 12 is a cross-sectional view of a fifth embodiment of a hand mixer with a softening function.

FIG. 12 provides yet another alternative hand mixer 390. The hand mixer 390 preferably includes two fan members 395 and heated coils 400, as well as funnel members 405, each of which are mounted on a respective beater shaft 410. The beater shafts 410 are substantially aligned with beaters 25 and are each designed to receive and engage a beater 25. The fan members 395 are preferably driven by a motor (not illustrated) and operated in a manner substantially similar to the above-described hand mixers. The coils 400 and funnel members 405 are also preferably positioned above and in substantial alignment with the beaters 25. Thus, when the fan member 395 is activated using one of the above-described methods, air is passed through the heated coils 400 and into the funnel members 405 which reduce in cross-sectional area as they approach the beaters 25 until the beaters 25 and funnel members 405 have roughly the same cross-sectional area. Thus, the heated air is filtered by the funnel members 405 toward the beaters 25 to make direct and substantial contact with the beaters 25. In this embodiment, the focus of the hand mixer 390 is substantially to heat the beaters 25, rather than the ingredients to be mixed within a bowl or other vessel.

Figure 13:
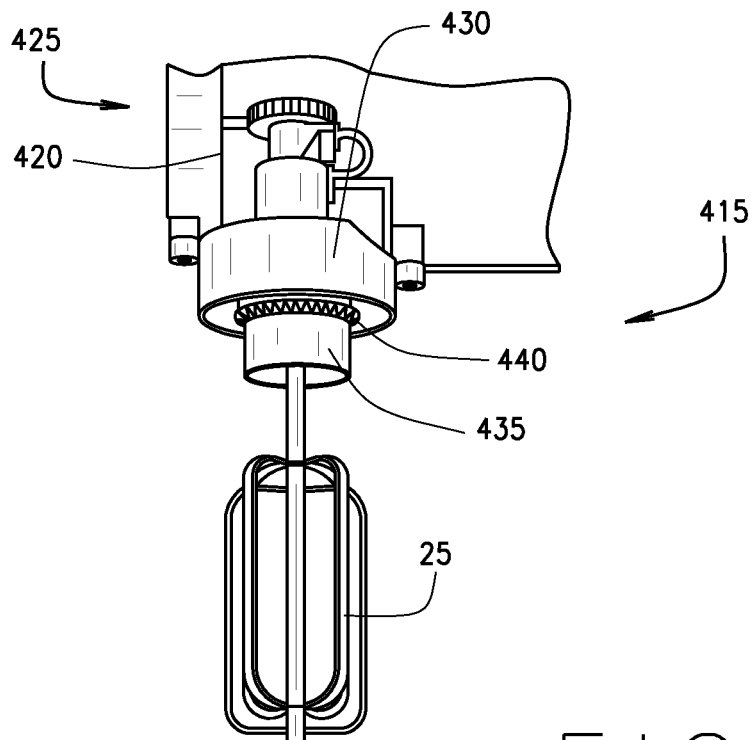
FIG. 13 is a partial cross-sectional view of a sixth embodiment of a hand mixer with a softening function.

In an alternative hand mixer 415, a portion of which is shown in FIG. 13, an ambient air intake 420 may be provided near a front portion 425 of the hand mixer 415. That ambient air may or may not be blown by a fan (not illustrated), but in either event is diverted downwardly upon entering an interior cavity of the hand mixer 415. A ring member 430 is preferably provided adjacent the cavity into which ambient air is taken in. The ring member 430 is preferably funnel-like in shape and thus directs the air downwardly toward the beater 25, as well as ingredients in the bowl or other vessel to be mixed. An additional cylinder member 435 is preferably provided within the ring member 430 and concentric thereto. Around an external portion of the cylinder member 435, a halogen heating element 440 is preferably provided. The halogen heating element 440 is preferably provided to heat air that is passed downwardly through the ring member 430 as it approaches each beater 25. The heating element 440 also may provide radiant heat downwardly toward the beater 25 and the ingredients to be mixed within the mixing bowl or vessel.

Figure 14:
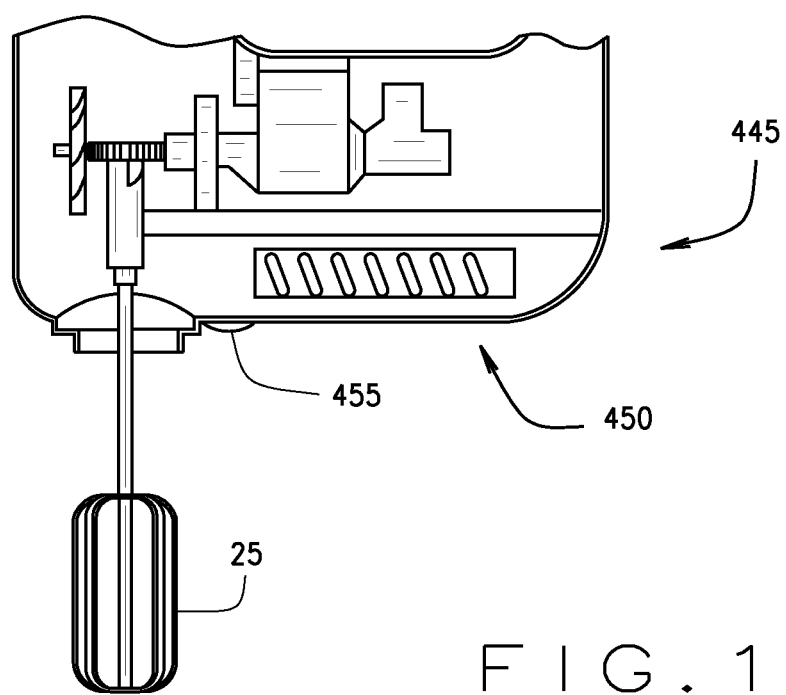
FIG. 14 is a partial cross-sectional view of a hand mixer with a softening function including a temperature sensor.

In an additional embodiment illustrated in FIG. 14, a hand mixer substantially similar to those embodiments described above, hand mixer 445 is provided on a lower portion 450 of the hand mixer 445 with an infrared temperature sensor 455. The temperature sensor 455 preferably is in electronic and data communication with various components of the hand mixer 445. The temperature sensor 455 uses a well-known and understood measuring method to determine the temperature of ingredients to be mixed within a mixing bowl or vessel. Depending on whether the temperature of those ingredients to be mixed has reached a certain threshold temperature, the temperature sensor 455 may send a signal to electronics contained within the hand mixer 445 to activate a heating activation function like those described for any of the above-described hand mixers. The sensor 455 may act as an automation method to allow a hand mixer such as the hand mixer 445 to determine when ingredients should be softened rather than be manually instructed to do so by a user.

Turning now to FIG. 15, an alternative to the hand mixers described above is provided in the form of a stick blender 460. The stick blender 460, like other hand blenders known and understood in the art, may be used as a self-contained blender that may be placed directly into a mixing vessel such as a mixing bowl. Such stick blenders like the stick blender 460 are often used to create dishes like mashed potatoes, froths, meringues, and the like.

The stick blender 460 shown in FIG. 15 preferably includes an upper portion 465 having a motor and power switch 470 that a user may use to turn on a blade 475 of the stick blender 460 located at a bottom portion 480 thereof. A second switch or other controller 485 may also be located at the top portion 465 of the stick blender 460 to activate a heat function of the stick blender 460. An interior of the stick blender 460 preferably includes, near its top portion 465, an intake fan 488 substantially similar to the intake fans described as part of the hand mixers above.

A plurality of heated coils 490 may also be provided downstream from the intake fan 470 located near the bottom portion 480 of the stick blender 460. When the heat button or control 485 is activated, air taken in by the fan 470 may be blown downwardly such that it passes through the heated coils 490. Preferably, an interior (not illustrated) of the stick blender 460 located below the heated coils 490 is hollow substantially continuously downwardly until it reaches an output area 495 adjacent to the blade 475. That way, when the stick blender 460 is used, and the heat function is activated, air generated by the intake fan 470 is heated by the coils 490, and subsequently flows downwardly until exiting the output area 495 into the ingredients to be blended. At the same time, when the motor and power switch 470 is activated, the blade 475 may operate to blend those same ingredients.

Turning to FIGS. 16 and 17, yet another alternative embodiment to the hand mixers and hand blender described above is provided. More particularly, a stand mixer 500 substantially similar to those often used in the art is provided. However, unlike other stand mixers in the prior art, the stand mixer 500 includes air channels 505 located on either side portion of the stand mixer 500. The air channels 505, when activated in a manner substantially similar to the heat activation functions for the hand mixers and hand blenders described above may use a fan, and a heating mechanism such as heating coils, to channel air into the air channels 505 and subsequently pass that air downwardly into a bowl such as the bowl 510 where ingredients are being mixed. When warmed air is passed into the bowl 510, the ingredients are preferably softened, and the mixing process may be made easier.

Yet alternative embodiments are not illustrated but are also contemplated herein. For example, in one alternative embodiment which may be used with either the hand mixer or the stand mixer, a rotating beater is provided with a heating element at its core. In that embodiment, power is transmitted to the heating element by way of a slip ring. The slip ring may transmit power to the heating element and is always making mechanical contact with the heating element. In that embodiment, a user may only apply power to the heater if he or she chooses to do so.

In an alternative embodiment, the slip ring may be mechanically separated from the heating element when the beater is running at high speeds. However, when a special heat and low speed function is used in association with the mixer, the heating element contacts the slip ring so that heat is generated in the heating element. This only takes place at low speeds where sufficient power may be reliably transmitted to the heating element for an extended period of time.

In this latter embodiment, a speed level controls the speed of the motor as it moves through its range of motion by contacting different circuit pads and triggering different motor speeds. At the heat and low speed function, the motor speed is lower so that the slip ring contacts the heating element, thus activating it.

In an altogether different embodiment, a static central heater core may be provided that extends downwardly from a mixer so that beaters rotate around the static central heater core when activated. In this embodiment, the heating functionality is preferably separated from the rotating beaters, and the central heater core is removable so that it can be cleaned.

The heater core, or rod, may include certain areas that are cooler than others and have designated hot areas to ensure an efficient heat transfer to the beaters and thus the ingredients. Similarly, the beaters may be designed to help efficient transfer of the heat from the central core or rod and counteract the effect of heat dissipation caused by air-cooling experienced by the rotating beater blades when the blades are in use. As such, the beaters may be designed in this embodiment to maximize the ability of the device to transfer heat from the beaters into the ingredients.

In operation, the central heater core or rod may remain static and not spin. The heat that the core or rod transfers may or may not be controlled by the user. In some embodiments, the heat transfer may be automatic, while in others it may be manually controlled.

The beaters or mixing paddle associated with each core or rod may rotate at a variety of rotation speeds. This rotational speed in some embodiments may be linked to the level of heat output generated by the core or rod. In at least one embodiment, the core or rod, and the beaters, may be independently operable relative to one another.

In at least some embodiments, an interlock may be provided to prevent usage of the device without the cores or rods and beaters in place to protect electrical connections in which the heaters and beaters are placed from moisture ingress. Similarly, the heating cores or rods may have a seal to prevent moisture ingress to their electrical connections.

In another embodiment altogether, the invention may include a rotating shaft having a heat pipe embedded in its core able to transmit thermal energy from the upper section of the shaft close to the mixing body to a lower section of the shaft where the ingredients are mixed. In this embodiment, the beaters and heat pipe rotate in unison. Such a heat pipe may be a device that is filled with a working liquid or vapor that uses the phase change of the working liquid to transmit heat efficiently.

The upper section of the beaters may be heated by a fixed heater on the main hand mixer body used to heat the upper pipe of the heat pipe. The heat pipe may then conduct heat from the upper part of the beater. The beater may have one or several heat pipes embedded inside of it to improve its heat conductivity and performance. The beaters may be designed to aid efficient transfer of the heat from the central core and counteract the effect of heat dissipation caused by air-cooling experienced by rotating beaters or blades. Like other embodiments described above, the beaters may be designed to maximize the ability of the device to transfer heat from the beaters into the ingredients.

In a different configuration, several heat pipes may be provided around the beater perimeter to help transport heat from the core of the beater into the beater arms. Those arms may then impart heat to the ingredients. The central core of the beater could be a rotating heater, static heater or a heat pipe.

In yet another embodiment, a hand mixer is provided that has rotational beaters to mix, as well as a heated masher that allows the user to mash colder ingredients in order to soften them. The heated masher may also keep the mixture warm while it is being mixed by the beaters.

In this embodiment, the beaters preferably rotate independently of the masher. The heating functionality is thus separated from the beaters and is provided instead by a heating element associated with the heated masher that can be removed for cleaning purposes. The heater/masher and beaters may be independently operable by a user.

The heated masher may have areas that are cool and others that are designated hot areas to increase the efficiency of the heat transfer to the beaters and ingredients. In operation, the heated masher may impart varying levels of heat which may or may not be controllable by a user. In one embodiment, the masher may be completely separate and independent from the beaters, or in another embodiment, the masher may be positioned as a core shaft in the center of the beaters to support the beaters and provide internal heat thereto.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A hand mixer for use with one or more mixing devices, the mixer having a softening function, the mixer comprising:
   a housing including a cavity;
   the cavity including a plurality of electrical and mechanical components used to drive a mixing function of the hand mixer;
   the cavity also including:
      an airflow conduit;
      a fan member for generating airflow from ambient environment through the airflow conduit and toward an output area located on a lower portion of the hand mixer;
      a motor for driving the fan member; and
      heated coils positioned downstream from the fan for heating the airflow generated by the fan member;
   wherein the output area is located to direct airflow toward the one or more mixing devices when in use; and
   wherein the fan member is located at a rear portion of the hand mixer and the output area is located adjacent to the one or more mixing devices.

2. The hand mixer defined in claim 1 wherein the hand mixer includes an output attachment member that is releasably attachable with the hand mixer adjacent to the output area.

3. The hand mixer defined in claim 2 wherein the output attachment member includes a plurality of baffle members to direct air generated by the fan member toward a bowl including ingredients to be mixed.

4. The hand mixer defined in claim 1 wherein the output area is in substantial alignment with one or more mixing devices of the hand mixer.

5. The hand mixer defined in claim 1 wherein the fan member is coupled to a shaft to which one or more mixing devices is releasably attached.

6. The hand mixer defined in claim 1 wherein a removable lint cover is provided on an exterior portion of the hand mixer adjacent to the fan member to prevent debris from being drawn into the hand mixer by the fan member.

7. The hand mixer defined in claim 1 wherein the hand mixer includes a funnel member attached to the lower portion of the hand mixer adjacent to the output area, the funnel member including the heated coils contained therein.

8. A hand mixer for use with one or more mixing devices, the mixer having a softening function, the mixer comprising:
   a housing including a cavity;
   the cavity including a plurality of electrical and mechanical components used to drive a mixing function of the hand mixer;
   the cavity also including:
      an airflow conduit;
      a fan member for generating airflow from ambient environment through the airflow conduit and toward an output area located on a lower portion of the hand mixer;
      a motor for driving the fan member; and
      heated coils positioned downstream from the fan for heating the airflow generated by the fan member;
   wherein the output area is located to direct airflow toward the one or more mixing devices when in use; and
   wherein the fan member is located at a front portion of the hand mixer and the output area is located adjacent to the one or more mixing devices.

9. A mixer having a softening function, the mixer comprising:
   a housing including:
   a fan member for blowing intake air toward an output area located on a lower portion of the mixer;
   a motor for driving the fan member; and
   heated coils positioned downstream from the fan for heating air generated by the fan member; and
   wherein the output area is located to deliver air to at least one of a bowl including ingredients to be mixed and one or more mixing devices releasably attached to the lower portion of the mixer.

10. The mixer defined in claim 9 wherein the fan member is located at a rear portion of the mixer and the output area is located adjacent to the one or more mixing devices.

11. The mixer defined in claim 9 wherein the mixer includes an output attachment member that is releasably attachable with the mixer adjacent to the output area.

12. The mixer defined in claim 11 wherein the output attachment member includes a plurality of baffle members to direct air generated by the fan member toward a bowl including ingredients to be mixed.

13. The mixer defined in claim 9 wherein the fan member is located at a front portion of the mixer and the output area is located adjacent to the one or more mixing devices.

14. The mixer defined in claim 9 wherein the output area is in substantial alignment with at least one or more mixing devices.

15. The mixer defined in claim 9 wherein the fan member is coupled to a shaft to which the one or more mixing devices is releasably attached.

16. The mixer defined in claim 9 wherein the fan member is located at a rear portion of the mixer and the output area is located adjacent to the one or more mixing devices.

17. The mixer defined in claim 9 wherein a removable lint cover is provided on an exterior portion of the mixer adjacent to the fan member to prevent debris from being drawn into the mixer by the fan member.

18. The mixer defined in claim 9 wherein the mixer includes a funnel member attached to the lower portion of the mixer adjacent to the output area, the funnel member including the heated coils contained therein.

* * * * *